3,555,115
LOW MOLECULAR WEIGHT POLYURETHANES CONTAINING N-t-BUTYL GROUPS
Charles Gregory Bottomley and Oliver Larry Hunt, Waynesboro, Va., assignors to E. I. du Pont de Nemours and Company, Wilmington, Del., a corporation of Delaware
No Drawing. Filed May 31, 1968, Ser. No. 733,272
Int. Cl. C08g 41/04, 51/60, 122/08
U.S. Cl. 260—858         12 Claims

ABSTRACT OF THE DISCLOSURE

Polyurethanes containing in the polymer chain tertiary amine nitrogen bearing a t-butyl substituent and having an inherent viscosity between 0.07 and 0.6 are blended with long-chain synthetic elastomeric segmented polyurethanes to stabilize the latter against discoloration by light and smog. Articles of such blends are more resistant to loss of physical properties upon exposure to chlorine bleaches than are articles stabilized with tertiary amines heretofore used.

BACKGROUND OF THE INVENTION

This invention relates to polyurethanes containing tertiary amine nitrogen in the polymer chain, to blends of such polyurethanes with long-chain synthetic elastomeric polyurethanes, and to articles of such blends.

It is known that spandex fibers and other articles which are based on long-chain synthetic elastomeric segmented polyurethanes are subject to discoloration on exposure to atmospheric conditions. The known tendency to discolor which results in an undesirable yellowing is particularly pronounced in the case of segmented polyurethanes containing in the polymer chain recurring ureylene residues, i.e., radicals of the formula —NH—CO—NH—. If the ureylene residue is attached to a carbon atom of an aromatic ring, the tendency to discolor is even more pronounced.

It is taught in Arvidson and Blake patent U.S. 2,999,839 that tertiary aliphatic amines having a molecular weight above 280 provide stabilization against discoloration in segmented polyurethanes. The amines disclosed therein, particularly methacrylate polymers, do offer protection against light and fume discoloration, but in chlorine bleaches accelerate the degradation of segmented polyurethanes. Hunt British Pat. 1,104,127 provides improvement over Arvidson and Blake by use of more hindered methacrylates that not only afford improved dyeability, protection against light and fume discoloration but also provide reduced degradation upon exposure to chlorine bleaches. Nevertheless under some conditions of laundering using chlorine bleaches, a substantial loss of physical properties of the segmented polyurethane occurs.

SUMMARY OF THE INVENTION

This invention provides polyurethanes containing tertiary amine nitrogen in the polymer chain which are stabilizers for long-chain synthetic elastomeric segmented polyurethanes. Polyurethanes of this invention comprise recurring units of the formula

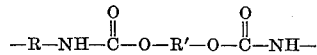

wherein R and R' are divalent aliphatic, cycloaliphatic, or araliphatic radicals of molecular weight below 400. At least one of R and R' in the above formula contains the tertiary amine nitrogen bonded to each of two non-carbonyl carbons not part of an aromatic ring and to a t-butyl group. The polyurethanes of this invention have inherent viscosities, measured as described hereinbelow, within the range of about 0.07 to 0.6.

The invention further provides long-chain segmented elastomeric polyurethanes which are stabilized against yellowing upon exposure to ultraviolet light and smog atmosphere by having physically incorporated therein a stabilizing quantity of a polyurethane of the type described hereinabove. Articles such as films and fibers prepared from these stabilized segmented polyurethanes are more resistant to loss of physical properties, i.e., polymer degradation, in chlorine bleaches than are articles of polyurethanes stabilized with tertiary amines of the prior art. In addition, the stabilized segmented polyurethanes of this invention display good dyeability and dye lightfastness.

DETAILED DESCRIPTION

Polyurethanes of this invention are prepared by reacting a suitable monomer containing a tertiary amine nitrogen bonded to a t-butyl group (hereinafter referred to as N-t-butyl) with a suitable complementary monomer under conditions suitable for polyurethane formation. For example, a glycol containing an N-t-butyl group is reacted with an organic diisocyanate, or a polyamine containing two NH$_2$ groups as well as an N-t-butyl group is reacted with a bischloroformate of a glycol. A reaction of the former type will provide a polyurethane in which R' in the above formula contains N-t-butyl, whereas a reaction of the latter type will provide a polyurethane in which R contains N-t-butyl. It will be apparent that the monomers could be chosen such that both R and R' contain N-t-butyl.

The points of attachment of the radicals R and R' are non-carbonyl carbon atoms not part of an aromatic ring. Othrewise R and R' can be virtually any divalent organic radical. They should of course be free of groups which would interfere with the condensation reaction which results in the polyurethane as well as groups which would produce undesirable color in the product. The monomers should be chosen such that R and R' are below about 400 molecular weight. Aliphatic, cycloaliphatic and araliphatic radicals which may contain hetero atoms such as O, S, Cl, and N, are all suitable for R and R'. One or both of R and R' must of course contain N as N-t-butyl.

In preparing the polyurethanes of this invention, the preferred procedure is to polymerize a glycol containing N-t-butyl with an organic diisocyanate. The N-t-butyl-dialakanolamines, such as N-t-butyldiethanolamine, are preferred for this purpose. Such reactants produce polyurethanes in which R' in the above formula is

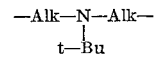

wherein Alk stands for lower alkylene of 1–8 carbon atoms and t-Bu stands for tertiary butyl. N-t-butyldiethanolamine is commercially available, but may also be obtained by reaction of t-butylamine and ethylene oxide. Higher homologs are also obtained by reaction of t-butylamine with an appropriate alkylene oxide. For example, 4-t-butyl-4-aza-2,6-heptanediol may be obtained by the reaction of t-butylamine and propylene oxide. Examples of organic diisocyanates which can be used are aliphatic diisocyanates, such as ethylene diisocyanate, trimethylene diisocyanate, tetramethylene diisocyanate, pentamethylene diisocyanate, and hexamethylene diisocyanate, and other higher members of this homologous series. Branched chain aliphatic diisocyanates such as 3-methylhexane-1,6-diisocyanate and 3,3'-dimethylpentane-1,5-diisocyanate can be used. Cycloaliphatic diisocyanates which are suitable include 1,3- and 1,4-cyclohexylene diisocyanates and 4,4'-methylenedicyclohexyl diisocyanate. Araliphatic diisocyanates include m- and p-xylylene diisocyanates and α,α,α',α'-tetramethyl-p-xylylene diisocyanate.

The polyurethanes of this invention have inherent viscosities in the range of 0.07 to 0.6. They are useful in formation of molded articles and are particularly useful for blending with polymers of higher inherent viscosity, e.g. polyurethanes, polyesters, and polyamides of fiber-forming molecular weight, to provide stabilization. For blending, the polyurethanes of this invention preferably have inherent viscosities of 0.13 to 0.20. Inherent viscosity is controlled in known manner by use of a proper mol ratio of monomers and/or by use of monofunctional chain terminators.

Inherent viscosity is defined as $$\frac{\ln \eta_r}{c}$$

in which $\eta_r$ is the viscosity of a dilute solution of the polymer divided by the viscosity of the solvent in the same units and at the same temperature, and $c$ is the concentration in grams of the polymer per 100 ml. of solution. The inherent viscosities of the polyurethanes of this invention are measured in N,N-dimethylacetamide at 25° C. at a concentration of 1 gram per 100 ml. of solution.

As indicated heretofore the principal use envisioned for the polyurethanes of this invention is incorporation, by physical blending, into long-chain synthetic elastomeric segmented polyurethanes to provide stabilization. These segmented polyurethanes are generally prepared from hydroxyl-terminated prepolymers, such as hydroxyl-terminated polyesters and polyethers of low molecular weight, i.e. about 600 to about 3000. Reaction of the prepolymer with a stoichiometric excess of organic diisocyanate produces an isocyanate-terminated polymeric intermediate which is then chain-extended with a difunctional, active hydrogen-containing compound such as water, hydrazine, organic diamines, glycols, dihydrazides, amino alcohols, etc. These segmented polyurethanes are well known in the art and described in several patents, among which are U.S. Pat. 2,929,801, 2,929,802, 2,929,-803, 2,929,804, 2,953,839, 2,957,852, 2,999,839, 3,040,-003, and 3,071,557 the disclosures of which are incorporated herein by reference.

The most important use for these segmented polyurethanes is of course the manufacture of spandex fibers which are incorporated into various kinds of garments. When these garments are washed in the usual chlorine bleaches the pH of the washing system may vary considerably over the range of about 8 to 9.5 depending upon the other fibers present. Thus, presence of cotton fibers may reduce the pH of the washing system to about 8.1. It has recently been found that the effect of a given amine stabilizer is dependent upon the pH of the washing system. For example at a pH above about 11, the polydiethylaminoethyl methacrylate stabilizer of Arvidson and Blake U.S. 2,999,839 does not accelerate discoloration and degradation of spandex, but at pH levels within the normally encountered range of 8 to 9.5 it does. Similarly, the more hindered methacrylates of Hunt British Pat. 1,104,127 tend to accelerate discoloration and degradation at the lower pH levels within the normally encountered range, although at higher levels within that range they have no deleterious effect. A principal advantage of the polyurethane stabilizers of this invention over tertiary amine stabilizers of the prior art is that they have only slight adverse effect upon physical properties of the spandex at all pH levels within the range 8 to 9.5.

In order to achieve the advantages of the invention, the amount of polyurethane containing N-t-butyl which is blended with the segmented elastomeric polyurethane should be sufficient to provide at least about 10 milliequivalents of tertiary amine nitrogen bonded to t-butyl per kilogram of segmented polyurethane, i.e. at least about 0.014% by weight. Preferably, the amount of such nitrogen should be at least 0.05% by weight. Amounts in excess of about 0.6% provide no additional advantage and are mere surplusage.

This invention will be further illustrated, but is not intended to be limited, by the following examples in which parts and percentages are by weight unless otherwise specified.

In the examples, the test for smog discoloration is performed by exposing film samples to atmospheric pollutants generated in a laboratory test chamber. Samples of the film are exposed for twelve hours to a synethetic atmosphere generated from a gaseous mixture of seven parts per million nitrogen dioxide, two parts per million sulfur dioxide, and eight parts per million 2-pentene in air (all parts by volume) by irradiating with eight "Black" fluorescent tubes (G.E. Type F30T8BL). A detailed procedure and description of the Scott Controlled Atmospheric Tester used is found in the Du Pont Technical Information Bulletin L-33 of the Textile Fibers Department Technical Service Section, E. I. du Pont de Nemours & Company, Inc., Wilmington, Del. This synthetic atmosphere has been found to simulate a "photochemical smog," thereby providing an accelerated discoloration test for reproducibly discoloring spandex yarn. It has been found that the color development obtained on exposure of samples in the laboratory test for twelve hours correlates well with a six-week exposure of elastic fabrics in Los Angeles, Calif., an area well known for smog problems.

The degree of yellowness, referred to in the examples as $b$ value, is determined from colorimetric data obtained by analyzing film samples which are about three inches square. The reflectance ratios of the samples in the green and blue filter settings of a colorimeter are measured, using a Model IV Color Master Differential Colorimeter, manufactured by Manufacturers Engineering and Equipment Corporation, Hatboro, Pa., and calibrated against the manufacturer's standard reference plates and the National Bureau of Standards' certified reflectance plates. The $b$ values are calculated from the average of three readings, using the following formula $$b = 42.34(G^{1/2} - B^{1/2})$$

where G represents the reflectance ratio with the green filter and B represents the reflectance ratio with the blue filter.

For fibers, the test for chlorine degradation is performed by attaching the fibers to hollow rectangular frames of Mylar® polyester, boiling the samples for one hour, and then immersing them for thirty minutes in an aqueous solution at 70° C. prepared by mixing 5.0 ml. of Clorox® (a hypochlorite bleach), 500 ml. of water, 1.0 gram of Tide® (an anionic detergent), and sufficient 0.1 N hydrochloric acid to give a pH of 8.5 measured at 25° C. The stress ("power") of the fiber samples at break is measured before and after the exposure to chlorine bleach. Film samples are similarly attached to Mylar® polyester frames. The films are heated for ten minutes at 150° C. and are boiled off for sixty minutes prior to testing. The films are exposed for twenty minutes in the chlorine-containing solution described above, and are then rinsed with cold water and dried for twenty minutes at 70° C. The stress ("power") of the film samples at 400% elongation and the elongation at break are measured before and after the exposure to chlorine bleach.

In the examples, the polyurethanes containing N-t-butyl all have inherent viscosities, measured as hereinabove described, between 0.07 and 0.6.

EXAMPLE I 100 grams of the isocyanate-terminated polyether prepolymer containing 3.27% NCO prepared as described in Example I of U.S. Pat. 3,149,998 is dissolved in 200 grams of N,N-dimethylacetamide and chain extended with a 103 gram portion of a solution prepared by dissolving 0.51 gram of diethylamine and 8.4 grams of 80/20 molar mixture of ethylenediamine and 1,3-cyclohexylenediamine in 300 grams N,N-dimethylacetamide. To this solution is added a solution of a non-segmented polyurethane prepared by (1) stirring 0.05 ml. of dibutyltin diacetate into a room temperature mixture of 140 grams of 4-t-butyl-4-aza-2,6-heptanediol, 175 grams 4,4'-methylenedicyclohexyl diisocyanate and 210 grams of N,N-dimethylacetamide and (2) maintaining the resulting mixture at 70° C. for 90 minutes. The non-segmented polyurethane is added in such proportion as to provide 50±3 milliequivalents tertiary amine nitrogen per kilogram of segmented polyurethane. The polymer solution is cast on Mylar® polyester sheets using a 7-mil doctor blade giving films having a thickness of 1.1±0.3 mils after drying at 50° C. for about 12 hours. Results of the chlorine degradation test are as follows:

Power, as prepared—154 g.
Power, after exposure—85 g.
Power retained—55%

EXAMPLE II

A solution of a segmented polyurethane in N,N-dimethylacetamide is prepared as described in Example III of British Pat. 1,102,819 from polytetramethylene ether glycol, p,p'-methylenediphenyl diisocyanate and ethylene diamine except that (1) the polytetramethylene ether glycol has a molecular weight of 1800, (2) the p,p'-methylenediphenyl diisocyanate to polytetramethylene ether glycol molar ratio is 1.60, (3) the ethylenediamine to capped glycol molar ratio is 0.980, (4) the ethylenediamine to diethylamine molar ratio is 4.95, (5) the percent solids is 34, and (6) the solution viscosity is 1800 poise. To separate samples of the above segmented polyurethane are added non-segmented polyurethanes obtained from the reaction of 4,4'-methylenedicyclohexyl diisocyanate and the glycol shown in Table I. The reaction conditions are as described in Example I.

TABLE I

| Glycol | | Diisocyanate/glycol, molar ratio |
|---|---|---|
| Sample: | | |
| A | 4-t-butyl-4-aza-2,6-heptanediol | |
| B | 3-t-butyl-3-aza-1,5-pentanediol | 0.862 |
| C | 3-n-butyl-3-aza-1,5-pentanediol | 0.917 |
| D | 3-methyl-3-aza-1,5-pentanediol | 0.930 |

Each composition contains 50 milliequivalents of tertiary amine nitrogen per kilogram of segmented polyurethane. A control sample of segmented polyurethane contains no additive and therefore no tertiary nitrogen (E). The samples are cast into films and tested for smog discoloration and chlorine degradation. The following results are obtained:

SMOG DISCOLORATION TEST

| | b values | | |
|---|---|---|---|
| | As prepared | After exposure | Δb |
| Sample: | | | |
| A | 2.5 | 5.2 | 2.7 |
| B | 2.6 | 7.0 | 4.4 |
| C | 2.5 | 6.8 | 4.3 |
| D | 2.5 | 8.9 | 6.4 |
| E | 2.6 | 12.3 | 9.7 |

CHLORINE DEGRADATION TEST

| | As prepared | | After exposure | | |
|---|---|---|---|---|---|
| | Power (g.) | Elongation at break (percent) | Power (g.) | Elongation at break (percent) | Percent power retained |
| Sample: | | | | | |
| A | 137 | 600 | 68 | 700 | 50 |
| B | 144 | 575 | 65 | 730 | 45 |
| C | 146 | 605 | (*) | 360 | 0 |
| D | 150 | 585 | (*) | 260 | 0 |
| E | 138 | 590 | 67 | 725 | 49 |

* Not measurable since sample breaks at less than 400% elongation.

EXAMPLE III

A solution of a segmented polyurethane in N,N-dimethylacetamide is prepared as described in Example I of British Pat. 1,102,819 from polytetramethylene ether glycol, p,p'-methylenediphenyl diisocyanate, ethylenediamine and 1,3-cyclohexylenediamine except that (1) the polytetramethylene ether glycol has a molecular weight of 1800, (2) the p,p'-methylenediphenyl diisocyanate to polytetramethylene ether glycol molar ratio is 1.70, (3) the diamine chain extender to capped glycol molar ratio is 0.993 and (4) the diamine chain extender to diethylamine molar ratio is 6.66. To each of four separate samples of the above solution of segmented polyurethane are added the non-segmented polyurethanes obtained from reaction of the diisocyanates and glycols shown in Table II.

TABLE II

| | Glycol | Diisocyanate | Diisocyanate/glycol molar ratio |
|---|---|---|---|
| Sample: | | | |
| A | 3-t-butyl-3-aza-1,5-pentanediol | Hexamethylene diisocyanate | 0.888 |
| B | 4-t-butyl-4-aza-2,6-heptanediol | Hexamethylene diisocyanate | 0.901 |
| C | 3-t-butyl-3-aza-1,5-pentanediol | 4,4'-methylene-dicyclohexyl diisocyanate | 0.860 |
| D | 4-t-butyl-4-aza-2,6-heptanediol | 4,4'-methylene-dicyclohexyl diisocyanate | 0.903 |

Each composition contains 35.7±0.5 milliequivalents of tertiary amine nitrogen per kilogram of segmented polyurethane. To each solution is added titanium dioxide, ultra marine blue pigment, and a resinous condensate of p-cresol and divinylbenzene having a molecular weight of about 2300. The final mixture contains 5.0% titanium dioxide, 125 parts per million ultra marine blue and 1.2% p-cresol/divinylbenzene condensate based on the segmented polyurethane. Fibers of 40 denier are obtained by dry-spinning of each solution in the conventional manner. The fibers are tested for chlorine degradation as described hereinabove. The stress ("power") at break is measured before and after exposure. Results are tabulated below.

| | Power (g.) | | Percent power retained |
|---|---|---|---|
| | As prepared | After exposure | |
| Sample: | | | |
| A | 57 | 14 | 25 |
| B | 56 | 25 | 45 |
| C | 61 | 15 | 25 |
| D | 54 | 21 | 39 |

EXAMPLE IV

To 1300 grams of polytetramethylene ether glycol having a number average molecular weight of about 2050 is added at room temperature under dry nitrogen 334 grams of 4,4'-methylenedicyclohexyl diisocyanate. The mixture is stirred and heated to 55° C. at which point 1 drop of dibutyltin dilaurate is added. Addition of the dibutyltin dilaurate causes the reaction temperature to rapidly rise to 77° C. Applying sufficient external heat to maintain the reaction mixture at 75–80° for 45 minutes gives an isocyanate terminated prepolymer containing 3.23% NCO. An 800 gram portion of the isocyanate terminated prepolymer is dissolved in 2247 grams N,N-dimethylacetamide, chain extended with 297 ml. of a 1.0 M solution of 1,3-cyclohexylenediamine in N,N-dimethylacetamide and subsequently chain terminated with 15.0 ml. of a 2.0 M solution of cyclohexylamine in N,N-dimethylacetamide. To a portion of this segmented polyurethane solution is added a solution of the non-segmented polyurethane described in Example III, Part D. The resulting solution contains 35 milliequivalents of tertiary amine nitrogen per kilogram of segmented polyurethane. To the segmented polymer solution is also added titanium dioxide, 2-(2'-hydroxy-3'-t-butyl-5'-methylphenyl)5-chlorobenzotriazole and tetrakis[3-(3,5-di-t-butyl-4-hydroxyphenyl)propionyloxy - methyl]methane in sufficient amount as to give concentrations of 4.7%, 0.5% and 1.54%, respectively, based on the segmented polyurethane. Fibers of 70-denier are obtained by dry-spinning in the conventional manner. The fibers are tested for chlorine degradation as described hereinabove. The stress ("power") at break is measured before and after exposure with the following results.

Power (grams per denier):
  As prepared _____ 0.52
  After exposure _____ 0.35
Percent power retained _____ 67

The practical upper limit of the amount of N-t-butyl-containing polyurethane of this invention which should be incorporated into segmented polyurethanes is about 15% by weight. As heretofore indicated, the amount should be at least sufficient to provide 10 meq. of N-t-butyl nitrogen per kilogram of segmented polyurethane. Thus, for blending, the amount of nitrogen present as N-t-butyl should be at least about 70 meq. per kilogram of N-t-butyl containing polymer, i.e. about 0.1% by weight.

What is claimed is:
1. A polyurethane containing in the polymer chain tertiary amine nitrogen bonded to each of two non-carbonyl carbons not part of an aromatic ring and further bonded to a t-butyl radical, said polyurethane comprising recurring units of the formula:

$$-R-NH-\overset{O}{\underset{\|}{C}}-O-R'-O-\overset{O}{\underset{\|}{C}}-NH-$$

wherein R and R' are divalent aliphatic, cycloaliphatic, or araliphatic radicals of molecular weight below 400 at least one of which contains said tertiary amine nitrogen, said polyurethane having an inherent viscosity in the range of about 0.07 to about 0.6 as measured in dimethylacetamide at 25° C. at a concentration of 1 gram per 100 ml. of solution.

2. Polyurethane of claim 1 wherein R' contains said tertiary amine nitrogen.
3. Polyurethane of claim 1 wherein R' is

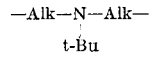

wherein Alk stands for lower alkylene and t-Bu stands for tertiary butyl.

4. Polyurethane of claim 3 wherein R' is selected from the group consisting of

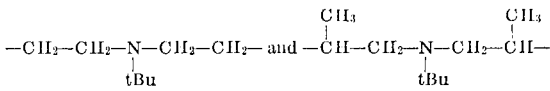

5. Polyurethane of claim 4 wherein R is 4,4'-methylenedicyclohexyl.
6. Polyurethane of claim 3 wherein R is hexamethylene.
7. Polyurethane of claim 1 having an inherent viscosity in the range of 0.13 to 0.20.
8. A long-chain synthetic elastomeric segmented polyurethane stabilized against discoloration by light and smog, by having physically incorporated therein a stabilizing quantity of polyurethane as defined in claim 1.
9. A long-chain synthetic elastomeric segmented polyurethane stabilized against discoloration by light and smog, by having physically incorporated therein a stabilizing quantity of a polyurethane as defined in claim 4.
10. A long-chain synhetic elastomeric segmented polyurethane stabilized against discoloration by light and smog, by having physically incorporated therein a stabilizing quantity of a polyurethane as defined in claim 7.
11. A shaped article of a stabilized segmented polyurethane as defined in claim 8.
12. A fiber of a stabilized segmented polyurethane as defined in claim 10.

References Cited
UNITED STATES PATENTS

| | | | |
|---|---|---|---|
| 3,040,003 | 6/1962 | Beaman | 260—77.5 |
| 3,180,853 | 4/1965 | Peters | 260—77.5 |
| 3,357,954 | 12/1967 | Kirkaldy | 260—75 |
| 3,388,100 | 6/1968 | Thoma et al. | 260—75 |
| 3,461,101 | 8/1969 | Oertel et al. | 260—75 |

DONALD E. CZAJA, Primary Examiner

H. S. COCKERAM, Assistant Examiner

U.S. Cl. X.R.
260—45.9, 75, 77.5